(12) United States Patent
Moroi et al.

(10) Patent No.: US 6,750,320 B2
(45) Date of Patent: Jun. 15, 2004

(54) PROCESS FOR PRODUCING POLYIMIDE PLATY OBJECT

(75) Inventors: Yoshihiro Moroi, Tokyo (JP); Hidehisa Nanai, Saitama (JP); Yuji Yamamoto, Tokyo (JP); Shigeki Sakaguchi, Tokyo (JP)

(73) Assignee: Central Glass Company, Limited, Yamaguchi (JP)

( * ) Notice: Subject to any disclaimer, the term of this patent is extended or adjusted under 35 U.S.C. 154(b) by 0 days.

(21) Appl. No.: 10/078,265

(22) Filed: Feb. 20, 2002

(65) Prior Publication Data
US 2002/0123610 A1 Sep. 5, 2002

(30) Foreign Application Priority Data
Feb. 20, 2001 (JP) ........................................ 2001-043076
Mar. 26, 2001 (JP) ........................................ 2001-086839

(51) Int. Cl.⁷ .......................... B32B 27/00; C08G 73/10
(52) U.S. Cl. ........................ 528/480; 528/170; 528/353; 528/503; 427/162; 427/240; 427/250; 427/362; 264/211; 264/212; 264/259; 428/473.5
(58) Field of Search ................................ 528/170, 353, 528/480, 503; 428/473.5; 264/211–212, 259, 311; 427/162, 240, 250, 362

(56) References Cited

U.S. PATENT DOCUMENTS 4,197,396 A * 4/1980 Banucci et al. ............. 528/208
5,167,987 A * 12/1992 Yu .............................. 427/171
5,261,977 A * 11/1993 Powell ......................... 156/74
5,478,918 A * 12/1995 Maruta et al. ............... 528/353
5,686,525 A * 11/1997 Maruta et al. ............... 524/600

FOREIGN PATENT DOCUMENTS

| JP | 3-072528 | 3/1991 |
| JP | 4-008734 | 1/1992 |
| JP | 4-009807 | 1/1992 |
| JP | 4-235505 | 8/1992 |
| JP | 4-235506 | 8/1992 |
| JP | 9-015608 | 1/1997 |
| JP | 10-045918 | 2/1998 |
| JP | 11-023870 | 1/1999 |
| JP | 11-262985 | 9/1999 |
| JP | 11-302380 | 11/1999 |

* cited by examiner

Primary Examiner—P. Hampton Hightower
(74) Attorney, Agent, or Firm—Crowell & Moring LLP

(57) ABSTRACT

A process for producing a polyimide platy object includes (a) providing a solution containing a solvent and a solute (i.e., a polyimide precursor or polyimide); (b) pouring the solution onto a supporting member; (c) removing a portion of the solvent from the solution at a first temperature lower than boiling point of the solvent, thereby forming a precursory platy object thereon, the precursory platy object having a self-supporting property and a first surface in contact with the supporting member and a second surface away therefrom and a first content of the solvent at the first surface and a second content (less than the first content by 2–10 wt %) of the solvent at the second surface; and (d) detaching the precursory platy object therefrom; and (e) heating the precursory platy object at a second temperature higher than boiling point of the solvent and is lower than decomposition temperature of the polyimide.

15 Claims, No Drawings

PROCESS FOR PRODUCING POLYIMIDE PLATY OBJECT

BACKGROUND OF THE INVENTION

The present invention relates to a process for producing a polyimide platy object, which can be used as a substrate of optical devices, electronic devices or electrooptical devices, and relates to such polyimide platy object having a sufficient strength and a sufficient surface flatness.

Materials for optical waveguides are required to have characteristics, for example, that optical loss is small, that their production procedures are simple, that their core and cladding can be well controlled in refractive index, and that they are improved in heat resistance. Hitherto, quartz-based materials have been studied the most intensively among optical waveguide materials. Quartz-based materials, however, have some defects in their production that they require a long time for producing an optical waveguide, that they require a heating at high temperature, and that it is difficult to form them into a piece of large area. In view of this, polymer materials (e.g., polymethylmethacrylate, polycarbonate, polysiloxane, and polyimide) have attracted much attention in recent years as hopeful optical waveguide materials.

In fact, polymethylmethacrylate has an advantage that it is possible to form an optical waveguide at low temperature with low production cost. In contrast, it is inferior in heat resistance and humidity resistance.

Polyimide is considerably superior to other plastics in heat resistance. Conventional polyimides were, however, inferior in light transmission. To overcome this defect, some studies have been conducted. Japanese Patent Unexamined Publication JP-A-3-72528 discloses a fluorinated polyimide superior in light transmission. JP-A-4-8734 discloses a fluorinated polyimide copolymer capable of controlling refractive index for the formation of an optical waveguide. JP-A-4-9807, JP-A-4-235505 and JP-A-4-235506 disclose fluorinated polyimide optical waveguides.

Even such polyimide optical waveguides, which are superior in light transmission and heat resistance, have some defects. For example, it is a problem of birefringence (double refraction). The occurrence of birefringence in polyimide optical waveguides is caused by residual stress remaining in the inside of the waveguides. It is known that this residual stress is caused by the difference in thermal expansion coefficient between polyimide and its substrate. In connection with this, JP-A-9-15608 discloses a polyimide film that is low in birefringence, produced by using a polyimide substrate for supporting thereon the polyimide film. With this, it becomes possible to eliminate the above-mentioned problem of thermal expansion coefficient difference therebetween. Such polyimide substrates are, however, generally large in surface roughness. Therefore, polyimide optical waveguides formed on such polyimide substrates have a defect that they do not easily transmit light therethrough, causing a large optical loss. Thus, such polyimide optical waveguides are not suitable for optical use. In connection with this, JP-A-11-23870 discloses that it is necessary to grind the surface of conventional polyimide substrates in order to use them for optical use and that an easily grindable film is formed on a polyimide substrate, followed by grinding of this film.

JP-A-11-262985 discloses a process for producing a polyimide substrate by laminating polyimide films using an adhesive (e.g., acrylic resin adhesives, epoxy resin adhesives). The use of such adhesive causes damage to the original characteristics of polyimide. That is, its heat resistance becomes inferior, and its thermal expansion coefficient deviates from the original value. There are some other problems, too. For example, it is necessary to have a complicated facility for laminating polyimide films in an industrial scale. Furthermore, it is difficult to adjust the thickness of such polyimide substrate.

Each of JP-A-10-45918 and JP-A-11-302380 discloses a process for molding a polyimide powder into a molded product. Since the particle size of the polyimide powder has an influence on the surface roughness of the molded product, it is difficult to achieve a sufficient flatness of the molded product. Therefore, it is necessary to conduct a grinding or the like to obtain its flatness.

SUMMARY OF THE INVENTION

It is therefore an object of the present invention to provide a polyimide platy object that is substantially free of the above-mentioned problem(s).

It is a more specific object of the present invention to provide a polyimide platy object that has superior heat resistance and superior strength of the original polyimide itself and a surface flatness sufficient for use in producing optical waveguides.

According to the present invention, there is provided a process for producing a polyimide platy object. This process comprises:

(a) providing a solution containing therein a solvent and a solute that is a polyimide precursor or a polyimide;

(b) pouring said solution onto a supporting member;

(c) removing a portion of said solvent from said solution by evaporation of said solvent at a first temperature that is lower than a boiling point of said solvent, thereby forming a precursory platy object on said supporting member, said precursory platy object having a self-supporting property, said precursory platy object having a first surface that is in contact with said supporting member and a second surface that is away from said supporting member, said precursory platy object having a first content of said solvent at said first surface and a second content of said solvent at said second surface, said first content being greater than said second content by an amount of 2–10 wt %;

(d) detaching said precursory platy object from said supporting member; and (e) heating said precursory platy object at a second temperature that is higher than said boiling point of said solvent and is lower than a decomposition temperature of said polyimide, thereby producing said polyimide platy object.

DETAILED DESCRIPTION

It is possible by the above process according to the present invention to stably produce a polyimide platy object that is free from bubbling caused by solvent removal and from warping caused by stress generation, that has a sufficient strength for having self-supporting property, and that has a sufficient surface flatness. In fact, it is possible thereby to stably produce a polyimide platy object having a thickness of 150 μm or greater. In contrast, it is difficult by conventional casting processes to produce such polyimide platy object.

The solution (containing as its solute a polyimide precursor or a polyimide) can be synthesized in accordance with a conventional method by mixing substantially equimolar amounts of a tetracarboxylic acid component (e.g., pyromellitic dianhydride) and a diamine component (e.g., an aromatic diamine) in a solvent to conduct a polycondensation of these components. The polyimide precursor may refer to at least one selected from a polyamide acid, its derivatives, and their mixtures optionally containing partially polyimidized ones. It is possible to turn the polyimide precursor to polyimide through ring closure of the polyimide precursor. According to need, this ring closure can be conducted by heating the polyimide precursor at a temperature of about 100–250° C., and/or by adding a suitable amount of a ring closure agent (e.g., dicyclohexylcarbodiimide) and/or a suitable amount of a ring closure catalyst (e.g., pyridine, isoquinoline, trimethylamine, aminopyridine, and imidazole).

The tetracarboxylic acid component is not particularly limited and may be selected from tetracarboxylic acid and its derivatives (e.g., acid anhydrides, acid chlorides, and esterified compounds). Concrete examples of the tetracarboxylic acid component include pyromellitic acid, (trifluoromethyl) pyromellitic acid, di(trifluoromethyl)pyromellitic acid, di(heptafluoropropyl)pyromellitic acid, pentafluoroethylpyromellitic acid, bis[3,5-di(trifluoromethyl)phenoxy] pyromellitic acid, 2,3,3',4'-biphenyltetracarboxylic acid, 3,3',4,4'-biphenyltetracarboxylic acid, 3,3',4,4'-tetracarboxydiphenyl ether, 2,3',3,4'-tetracarboxydiphenyl ether, 3,3',4,4'-benzophenonetetracarboxylic acid, 2,3,6,7-tetracarboxynaphthalene, 1,4,5,7-tetracarboxynaphthalene, 1,4,5,6-tetracarboxynaphthalene, 3,3',4,4'-tetracarboxydiphenylmethane, 3,3',4,4'-tetracarboxydiphenylsulfone, 2,2-bis(3,4-dicarboxyphenyl)propane, 2,2-bis(3,4-dicarboxyphenyl)hexafluoropropane, 5,5'-bis(trifluoromethyl)-3,3',4,4'-tetracarboxybiphenyl, 2,2', 5,5'-tetraquis(trifluoromethyl)-3,3',4,4'-tetracarboxybiphenyl, 5,5'-bis(trifluoromethyl)-3,3',4,4'-tetracarboxydiphenyl ether, 5,5'-bis(trifluoromethyl)-3,3',4,4'-tetracarboxybenzophenone, bis[(trifluoromethyl) dicarboxyphenoxy]benzene, bis[(trifluoromethyl) dicarboxyphenoxy](trifluoromethyl)benzene, bis (dicarboxyphenoxy)(trifluoromethyl)benzene, bis (dicarboxyphenoxy)bis(trifluoromethyl)benzene, bis (dicarboxyphenoxy)tetraquis(trifluoromethyl)benzene, 3,4, 9,10-tetracarboxyperylene, 2,2-bis[4-(3,4-dicarboxyphenoxy)phenyl]propane, butanetetracarboxylic acid, cyclopentanetetracarboxylic acid, 2,2-bis[4-(3,4-dicarboxyphenoxy)phenyl]hexafluoropropane, bis [(trifluoromethyl) dicarboxyphenoxy]biphenyl, bis [(trifluoromethyl)dicarboxyphenoxy]bis(trifluoromethyl)-biphenyl, bis[(trifluoromethyl)dicarboxyphenoxy]diphenyl ether, bis(dicarboxyphenoxy)bis(trifluoromethyl)biphenyl, bis(3,4-dicarboxyphenyl)dimethylsilane, 1,3-bis(3,4-dicarboxyphenyl)tetramethyldisiloxane, difluoropyromellitic acid, 1,4-bis(3,4-dicarboxytrifluorophenoxy) tetrafluorobenzene, and 1,4-bis(3,4-dicarboxytrifluorophenoxy)octafluorobiphenyl.

The diamine component may be diamine or its diisocyanate derivative. Its concrete examples include m-phenylenediamine, 2,4-diaminotoluene, 2,4-diaminoxylene, 2,4-diaminodurene, 4-(1H,1H,11H-eicosafluoroundecanoxy)-1,3-diaminobenzene, 4-(1H,1H-perfluoro-1-butanoxy)-1,3-diaminobenzene, 4-(1H,1H-perfluoro-1-heptanoxy)-1,3-diaminobenzene, 4-(1H,1H-perfluoro-1-octanoxy)-1,3-diaminobenzene, 4-pentafluorophenoxy-1,3-diaminobenzene, 4-(2,3,5,6-tetrafluorophenoxy)-1,3-diaminobenzene, 4-(4-fluorophenoxy)-1,3-diaminobenzene, 4-(1H,1H,2H,2H-perfluoro-1-hexanoxy)-1,3-diaminobenzene, 4-(1H,1H,2H, 2H-perfluoro-1-dodecanoxy)-1,3-diaminobenzene, p-phenylenediamine, 2,5-diaminotoluene, 2,3,5,6-tetramethyl-p-phenylenediamine, 2,5-diaminobenzotrifluoride, bis(trifluoromethyl) phenylenediamine, diaminotetra(trifluoromethyl)benzene, diamino(pentafluoroethyl)benzene, 2,5-diamino (perfluorohexyl)benzene, 2,5-diamino(perfluorobutyl) benzene, benzidine, 2,2'-dimethylbenzidine, 3,3'-dimethylbenzidine, 3,3'-dimethoxybenzidine, 2,2'-dimethoxybenzidine, 3,3',5,5'-tetramethylbenzidine, 3,3'-diacetylbenzidine, 2,2'-bis(trifluoromethyl)-4,4'-diaminobiphenyl, octafluorobenzidine, 3,3'-bis (trifluoromethyl)-4,4'-diaminobiphenyl, 4,4'-oxydianiline, 4,4'-diaminodiphenylmethane, 4,4'-diaminodiphenylsulfone, 2,2-bis(p-aminophenyl)propane, 3,3'-dimethyl-4,4'-diaminodiphenyl ether, 3,3'-dimethyl-4, 4'-diaminodiphenylmethane, 1,2-bis(anilino)ethane, 2,2-bis (p-aminophenyl)hexafluoropropane, 1,3-bis(anilino) hexafluoropropane, 1,4-bis(anilino)octafluorobutane, 1,5-bis(anilino)decafluoropentane, 1,7-bis(anilino) tetradecafluoroheptane, 2,2'-bis(trifluoromethyl)-4,4'-diaminodiphenyl ether, 3,3'-bis(trifluoromethyl)-4,4'-diaminodiphenyl ether, 3,3',5,5'-tetraquis(trifluoromethyl)-4,4'-diaminodiphenyl ether, 3,3'-bis(trifluoromethyl)-4,4'-diaminobenzophenone, 4,4'-diamino-p-terphenyl, 1,4-bis(p-aminophenyl)benzene, p-bis(4-amino-2-trifluoromethylphenoxy)benzene, bis(aminophenoxy)bis (trifluoromethyl)benzene, bis(aminophenoxy)tetraquis (trifluoromethyl)benzene, 4,4'-diamino-p-quaterphenyl, 4,4'-bis(p-aminophenoxy)biphenyl, 2,2-bis[4-(p-aminophenoxy)phenyl]propane, 4,4'-bis(3-aminophenoxyphenyl)diphenylsulfone, 2,2-bis[4-(4-aminophenoxy)phenyl]hexafluoropropane, 2,2-bis[4-(3-aminophenoxy)phenyl]hexafluoropropane, 2,2-bis[4-(2-aminophenoxy)phenyl]hexafluoropropane, 2,2-bis[4-(4-aminophenoxy)-3,5-dimethylphenyl]hexafluoropropane, 2,2-bis[4-(4-aminophenoxy)-3,5-ditrifluoromethylphenyl] hexafluoropropane, 4,4'-bis(4-amino-2-trifluoromethylphenoxy)biphenyl, 4,4'-bis(4-amino-3-trifluoromethylphenoxy)biphenyl, 4,4'-bis(4-amino-2-trifluoromethylphenoxy)diphenylsulfone, 4,4'-bis(3-amino-5-trifluoromethylphenoxy)diphenylsulfone, 2,2-bis[4-(4-amino-3-trifluoromethylphenoxy)phenyl] hexafluoropropane, bis[(trifluoromethyl)aminophenoxy] biphenyl, bis[{(trifluoromethyl)aminophenoxy}phenyl] hexafluoropropane, diaminoanthraquinone, 1,5-diaminonaphthalene, 2,6-diaminonaphthalene, bis[{2-(aminophenoxy)phenyl}hexafluoroisopropyl]benzene, bis (2,3,5,6-tetrafluoro-4-aminophenyl)ether, bis(2,3,5,6-tetrafluoro-4-aminophenyl)sulfide, 1,3-bis(3-aminopropyl) tetramethyldisiloxane, 1,4-bis(3-aminopropyldimethylsilyl) benzene, bis(4-aminophenyl)diethylsilane, 1,3-diaminotetrafluorobenzene, 1,4-diaminotetrafluorobenzene, and 4,4'-bis(tetrafluoroaminophenoxy)octafluorobiphenyl.

Examples of the solvent for dissolving a polyimide precursor or a polyimide are N,N-dimethylformamide, N,N-dimethylacetoamide, N-methylpyrolidone, N,N-dimethylsulfoxide, sulforane, m-cresol, p-cresol, 3-chlorophenol, 4-chlorophenol, γ-butyrolactone, γ-valerolactone, δ-valerolactone, γ-caprolactone, ε-caprolactone, α-methyl-γ-butyrolactone, ethylene carbonate, propylene carbonate, triethylene glycol, acetophenone, and 1,3-dimethyl-2-imidazolyzinone, Although the solute concentration of the solution may be varied depending on the degree of the imidization of the polyimide precursor, it may be 50 wt % or lower, preferably 40 wt % or lower. Although viscosity of the solution may also be varied depending on the degree of the imidization of the polyimide precursor, it is preferably about 100–20,000 centipoises.

The supporting member for supporting thereon the polyimide platy object is not limited to a particular material, as long as it is made of a material that does not deform, not damage, not melt or not dissolve at a temperature that is slightly higher than boiling point of the solvent. The supporting member may be made of a heat resistant material selected from glass, enamelware, ceramics, inorganic compound crystals, silicon, iron, nickel, stainless steel, and materials lined with these. The surface of the supporting member is preferably flat in order to support thereon the polyimide platy object. Furthermore, the supporting member may be in the form a dish having a peripheral wall for containing the solution. Such dish may be made of glass (e.g., Petri dish), iron, enamel, or stainless steel.

The way of pouring the solution onto the supporting member is not particularly limited. It may be spin coating, coating with doctor blade, or roller coating. The thickness of the poured solution on the supporting member may be arbitrarily selected depending on the desired thickness of the polyimide platy object.

Upon pouring the solution, it is optional to provide a frame member or weir on the supporting member in order to make the solution not to expand unexpectedly, if the supporting member does not have such frame member or weir. Such frame member or weir may be left on the supporting member during the removal of a portion of the solvent.

The removal of a portion of the solvent from the solution can be conducted by heating and/or pressure reduction at a first temperature that is lower than boiling point of the solvent. If this removal is conducted at a temperature that is higher than boiling point of the solvent, the resulting precursory platy object may have bubbles and cracks. Furthermore, the precursory platy object may have warping after the detachment from the supporting member. The heating for the removal can be conducted by raising the temperature gradually or stepwise. The rate for removing the solvent can be controlled by adjusting the temperature-raising rate. With this, it becomes possible to prevent the generation of bubbles and cracks in the precursory platy object. The temperature-raising rate is preferably not greater than 5° C./min, more preferably not greater than 3° C./min. It is preferable to lower the temperature-raising rate as the precursory platy object becomes greater in thickness. The manner of conducting the heating is not particularly limited. It can be conducted in a warm air circulating drier (oven). It is preferable to maintain the supporting member horizontally during the removal. Furthermore, it is optional to conduct the removal of a portion of the solution under a windless condition in order to obtain a uniform thickness of the precursory platy object.

By removing a portion of the solvent, the degree of imidization of the polyimide precursor may proceed further. After removing a portion of the solvent, it is possible to obtain a precursory platy object having a self-supporting property. In other words, the precursory platy object itself can maintain its shape, even if the above-mentioned frame member or weir is detached from the supporting member.

As stated above, the precursory platy object has a first surface that is in contact with the supporting member and a second surface that is away from the supporting member. These first and second surfaces may be two major surfaces of the precursory platy object that are opposed to each other. According to the present invention, a first content of the solvent at the first surface is greater than a second content of the solvent at the second surface by an amount of 2–10 wt %. The inventors unexpectedly found that it is possible to prevent bubbling and warping of the precursory platy object after its detachment from the supporting member by making the first content greater than the second content by an amount (difference) of 2–10 wt %. This making is possible by suitably adjusting, for example, the heating time and the heating temperature for removing a portion of the solvent and the thickness of the solution poured onto the supporting member. If the difference is less than 2 wt %, the precursory platy object tends to have bubbles. If the difference is greater than 10 wt %, warping of the precursory platy object tends to occur after its detachment from the supporting member due to the stress difference between the first and second surfaces of the precursory platy object. Therefore, the precursory platy object may be bent, when it is fixed to a frame member for conducting the heating of the precursory platy object, thereby lowering the production efficiency and workability.

The first and second contents of the solvent can respectively be determined by analyzing first and second samples each taken from a thickness of 50 $\mu$m at the first and second surfaces of the precursory platy object. This analysis can be conducted by a thermogravimetric analysis in which the amount of the weight reduction relative to the total weight of the sample is measured.

The precursory platy object may contain 5–50 wt % (preferably 10–40 wt %) of the solvent, based on the total weight of the precursory platy object. If it is greater than 50 wt %, the precursory platy object may become inferior in mechanical strength and self-supporting property. This may cause production procedure problems. For example, it may become difficult to detach the precursory platy object from the supporting member. If the solvent is less than 5 wt %, the precursory platy object may have bubbles. The bubbling may be prevented by spending too much time for removing a portion of the solvent, even if the solvent is less than 5 wt %. However, this is not suitable in an industrial scale production. Furthermore, in some cases, the precursory platy object may have warping after its detachment from the supporting member. With this, the precursory platy object may be bent, when it is fixed to a frame member for conducting the heating of the precursory platy object, thereby lowering the production efficiency and workability.

The solvent content of the precursory platy object may refer to the amount of the weight reduction in a range of 25–300° C. measured in the thermogravimetric analysis.

Before pouring the solution, it is optional to apply a release agent to the surface of the supporting member by spraying or the like in order to facilitate the detachment of the precursory platy object from the supporting member. The release agent may be a fluorine-containing one.

The heating of the precursory platy object is conducted at a second temperature that is higher than boiling point of the solvent and is lower than decomposition temperature of the polyimide. By this heating, the polyimide precursor, if any, turns into the corresponding polyimide, and the solvent remaining in the precursory platy object is substantially completely removed. If the heating is conducted at boiling point of the solvent, it may be necessary to spend too much time to substantially completely remove the solvent. Therefore, it is practical to conduct the heating at a temperature that is higher than boiling point of the solvent.

The second temperature for conducing the heating of the precursory platy object may be from 300 to 500° C., preferably from 350 to 500° C., under a normal pressure (e.g., atmospheric pressure). If this heating is conducted under reduced pressure or pressurized condition, the second temperature may be varied in view of the boiling point that changes depending on the pressure. If the heating is conducted at a temperature that is higher than glass transition point of the polyimide, it can be expected to exhibit the original properties of the polyimide.

The heating of the precursory platy object can be conducted by raising the temperature gradually or stepwise. The rate for removing the solvent from the precursory platy object can be controlled by adjusting the temperature-raising rate. With this, it becomes possible to prevent the generation of bubbles and cracks. The temperature-raising rate is preferably not greater than 5° C./min, more preferably not greater than 3° C./min. The manner of conducting the heating is not particularly limited. It can be conducted in a warm air circulating drier (oven).

During the heating of the precursory platy object, it is preferable to fix the precursory platy object to a frame member and to put the precursory platy object under a tensile load, while both major surfaces of the precursory platy object are separated from other members (e.g., the supporting member). This tensile load may be from 5 to 50 kPa. If it is less than 5 kPa, the resulting polyimide platy object may become inferior in flatness. If it is greater than 50 kPa, the precursory platy object may be broken or deformed during the heating.

In order to improve the polyimide platy object in flatness, it is optional to subject the precursory platy object to an extrusion molding using a roller coater or the like or to a press molding, followed by the heating of the precursory platy object. Furthermore, it is optional to subject the polyimide platy object to a press molding, too.

The polyimide platy object may be produced one piece by one piece separately. However, it is needless to say that it can be produced continuously using rollers and the like in order to improve productivity.

The polyimide platy object is a platy object made of a polyimide. It is usable as a substrate of optical devices, electronic devices or electrooptical devices. In particular, it is usable as a substrate of optical waveguides, optical switches and optical amplifiers. Furthermore, it can be applied to other parts such as V-shaped groove substrate. Thus, the polyimide platy object is required to have a self-supporting property when it has a size for the actual use. The polyimide platy object may have a thickness from 150 μm to 10 mm, depending on its areal size. This thickness is preferably 2 mm or less, more preferably 1 mm or less, and preferably 250 μm or greater. When the polyimide platy object has such thickness, it may have a Young's modulus of 2 GPa or greater, preferably 4 GPa or greater, from the viewpoint of stability and workability in the steps for producing waveguides. If it is less than 2 GPa, the polyimide platy object may become inferior in self-supporting property and thereby may be deformed during the production of waveguides.

The polyimide platy object produced in accordance with the invention can preferably be used for producing a polyimide optical waveguide. Exemplary fluorinated polyimides for producing optical waveguides include (1) a first fluorinated polyimide (6FDA/TFDB) produced by reacting 2,2-bis(3,4-dicarboxyphenyl)hexafluoropropanedianhydride (6FDA) with 2,2'-bis(trifluoromethyl)-4,4'-diaminobiphenyl (TFDB), (2) a second fluorinated polyimide (6FDA/ODA) produced by reacting 6FDA with 4,4'-oxydianiline (ODA), and (3) a third fluorinated polyimide (i.e., a copolymer of 6FDA, TFDB and ODA). In fact, the first and second fluorinated polyimides are respectively 82 ppm and 61 ppm in theoretical thermal expansion coefficient. When the polyimide platy object has an actual thermal expansion coefficient close to its theoretical thermal expansion coefficient, it is possible to substantially suppress the occurrence of birefringence. The polyimide platy object according to the invention preferably has an average thermal coefficient of 60 ppm or greater over a range of 50–300° C.

The polyimide platy object according to the invention preferably has a glass transition temperature of 300° C. or higher. Therefore, it has a heat resistance against a temperature of 300° C. or higher.

The polyimide platy object according to the invention is made to have a surface roughness of preferably 50 nm or less, more preferably 10 nm or less. If it is greater than 50 nm, the polyimide platy object may become inferior in light transmission and thereby unsuitable for optical use.

The following nonlimitative solution preparations and examples are illustrative of the present invention. In the following examples, surface roughness was measured by using a probe-type surface roughness meter, TENCOR P-10 (trade name) of KLA-Tencor Co., with a measurement length of 3 mm over the surface of the polyimide platy object, with a probe load of 25 mg, and with a Ra mode.

Solution Preparation 1

A three-necked flask was charged with 88.8 g (0.2 mol) of 2,2-bis(3,4-dicarboxyphenyl)hexafluoropropanedianhydride (6FDA), 64.0 g (0.2 mol) of 2,2'-bis(trifluoromethyl)-4,4'-diaminobiphenyl (TFDB), and 696.0 g of N,N-dimethylacetoamide (DMAc). The resulting mixture was stirred at room temperature for 3 days under an atmosphere of nitrogen, thereby obtaining a first polyamide acid solution having a solute concentration of 15 wt % and a viscosity of 180 poises.

Solution Preparation 2

A three-necked flask was charged with 88.8 g (0.2 mol) of 6FDA, 44.8 g (0.14 mol) of TFDB, 12.0 g (0.06 mol) of 4,4'-oxydianiline (ODA), and 825.6 g of DMAc. The resulting mixture was stirred at room temperature for 3 days under an atmosphere of nitrogen, thereby obtaining a second polyamide acid solution having a solute concentration of 15% and a viscosity of 160 poises.

Solution Preparation 3

A three-necked flask was charged with 88.8 g (0.2 mol) of 6FDA, 64.0 g (0.2 mol) of TFDB, and 356.5 g of γ-butyrolactone. The resulting mixture was stirred in an oil bath at 170° C. for 6 hours under an atmosphere of nitrogen, thereby obtaining a polyimide solution having a solute concentration of 30 wt % and a viscosity of 50 poises.

EXAMPLE 1

At first, 15 g of the first polyamide acid solution of Solution Preparation 1 were poured onto a glass substrate having widths of 20 cm using an applicator. Then, the coated glass substrate was heated in an oven at 70° C. for 2 hr and then at 150° C. for 2 hr, thereby removing a portion of the solvent from the solution. The resulting precursory platy object was detached from the glass substrate. Upon this, warping of the precursory platy object did not occur. The first and second contents of the solvent were measured in a manner as explained above and thereby were found to be 18 wt % and 13 wt %, respectively. Then, the precursory platy object was fixed to a frame, followed by heating in an oven at 200° C. for 2 hr and then at 380° C. for 2 hr, thereby removing the solvent substantially completely. The resulting polyimide platy object was found to have a thickness of 150 µm, a Young's modulus of 4 GPa, a thermal expansion coefficient of 78 ppm, a glass transition temperature of 325° C., a surface roughness of 4 nm or less. Furthermore, the polyimide platy object did not have bubbles and warping.

EXAMPLE 2

An optical waveguide was prepared by using a polyimide platy object obtained in Example 1, as follows. At first, the first polyamide acid solution of Solution Preparation 1 was applied to the polyimide platy object by spin coating, followed by heating at 70° C. for 2 hr, then at 160° C. for 1 hr, then at 250° C. for 30 min and then at 350° C. for 1 hr to form an under cladding layer having a thickness of 15 µm. Then, the second polyamide acid solution of Solution Preparation 2 was applied to the under cladding layer by spin coating, followed by the same heating as above to form a core layer thereon. Then, a straight core pattern (length: 70 mm; width: 8 µm; and thickness: 8 µm) was formed on the core layer by photolithography and dry etching. Then, the first polyamide acid solution was applied to the core layer by spin coating, followed by the same heating as above to form an over cladding layer having a thickness of 15 µm. The resulting waveguide was subjected to a light transmission measurement by transmitting a light of 1.3 µm therethrough with a cutback method. The result was 0.6 dB/cm, which is suitable for optical waveguide.

EXAMPLE 3

At first, a release agent was applied to a glass substrate having widths of 20 cm. Then, 50 g of the polyimide solution of Solution Preparation 3 were applied to the release agent film using an applicator. Then, the coated glass substrate was heated in an oven at 70° C. for 2 hr and then at 150° C. for 2 hr, thereby removing a portion of the solvent from the solution. The resulting precursory platy object was detached from the glass substrate. Upon this, warping of the precursory platy object did not occur. The first and second contents of the solvent were measured in a manner as explained above and thereby were found to be 22 wt % and 16 wt %, respectively. Then, the precursory platy object was fixed to a frame, followed by heating in an oven at 200° C. for 2 hr and then at 380° C. for 2 hr, thereby removing the solvent substantially completely. In this heating, the temperature was raised at a rate of 3° C./min. The resulting polyimide platy object was found to have a thickness of 550 µm, a Young's modulus of 4.5 GPa, a thermal expansion coefficient of 78 ppm, a glass transition temperature of 325° C., a surface roughness of 4 nm or less. Furthermore, the polyimide platy object did not have bubbles and warping.

EXAMPLE 4

Example 2 was repeated except in that a polyimide platy object obtained in Example 3 was used for preparing an optical waveguide. The resulting waveguide was subjected to the same light transmission measurement as in Example 2. The result was 0.5 dB/cm, which is suitable for optical waveguide.

EXAMPLE 5

At first, a release agent was applied to a glass substrate having widths of 20 cm. Then, 100 g of the polyimide solution of Solution Preparation 3 was applied to the release agent film using an applicator. Then, the coated glass substrate was heated in an oven by raising the temperature from room temperature to 150° C. by spending 6 hr and then by maintaining the temperature at 150° C. for 2 hr, thereby removing a portion of the solvent from the solution. The resulting precursory platy object was detached from the glass substrate. Upon this, warping of the precursory platy object did not occur. The first and second contents of the solvent were measured in a manner as explained above and thereby were found to be 25 wt % and 18 wt %, respectively. Then, the precursory platy object was fixed to a frame, followed by heating in an oven at 150° C. for 2 hr, then at 220° C. for 2 hr, and then at 380° C. for 2 hr, thereby removing the solvent substantially completely. The resulting polyimide platy object was found to have a thickness of 1 mm, a Young's modulus of 4.3 GPa, a thermal expansion coefficient of 78 ppm, a glass transition temperature of 325° C., a surface roughness of 5 nm or less. Furthermore, the polyimide platy object did not have bubbles and warping.

EXAMPLE 6

Example 2 was repeated except in that a polyimide platy object obtained in Example 5 was used for preparing an optical waveguide. The resulting waveguide was subjected to the same light transmission measurement as in Example 2. The result was 0.5 dB/cm, which is suitable for optical waveguide.

COMPARATIVE EXAMPLE

At first, 50 g of the first polyamide acid solution of Solution Preparation 1 were poured onto a glass substrate having widths of 20 cm using an applicator. Then, the coated glass substrate was heated in an oven at 70° C. for 2 hr and then 210° C. for 2 hr, thereby removing a portion of the solvent from the solution. The resulting precursory platy object was detached from the glass substrate. Upon this, the precursory platy object curled greatly. The first and second contents of the solvent were measured in a manner as explained above and were found to be 5 wt % and 4 wt %, respectively. Then, it was tried to fix the precursory platy object to a frame. Upon this fixing, however, the precursory platy object was broken.

The entire disclosure of Japanese Patent Applications Nos. 2001-043076 (filed on Feb. 20, 2001) and 2001-086839 (filed on Mar. 26, 2001), including specification, claims and summary, is incorporated herein by reference in its entirety.

What is claimed is:

1. A process for producing a polyimide platy object, said process comprising:
    (a) providing a solution containing therein a solvent and a solute that is a polyimide precursor or a polyimide;
    (b) pouring said solution onto a supporting member;
    (c) removing a portion of said solvent from said solution by evaporation of said solvent at a first temperature that is lower than a boiling point of said solvent, thereby forming a precursory platy object on said supporting member,
    said precursory platy object having a self-supporting property,
    said precursory platy object having a first surface that is in contact with said supporting member and a second surface that is away from said supporting member,
    said precursory platy object having a first content of said solvent at said first surface and a second content of said solvent at said second surface, said first content being greater than said second content by an amount of 2–10 wt %;

(d) detaching said precursory platy object from said supporting member; and (e) heating said precursory platy object at a second temperature that is higher than said boiling point of said solvent and is lower than a decomposition temperature of said polyimide, thereby producing said polyimide platy object.

2. A process according to claim 1, wherein said precursory platy object contains 5–50 wt % of said solvent, based on a total weight of said precursory platy object.

3. A process according to claim 1, wherein said heating is conducted while said precursory platy object is fixed to a frame.

4. A process according to claim 1, wherein said second temperature of said heating is from 300 to 500° C.

5. A process according to claim 1, wherein said solution has a concentration of said solute of 50 wt % or lower.

6. A process according to claim 1, wherein said solution has a viscosity of 100–20,000 centipoises.

7. A process according to claim 1, wherein said removing is conducted by raising said first temperature at a rate of 5° C./min or less.

8. A process according to claim 1, wherein said first and second contents of said solvent are respectively determined by analyzing first and second samples each taken from a thickness of 50 µm at said first and second surfaces of said precursory platy object.

9. A process according to claim 1, wherein said heating is conducted by raising said second temperature at a rate of 5° C./min or less.

10. A process according to claim 1, wherein said heating is conducted while said precursory platy object is under a tensile load of 5–50 kPa.

11. A process according to claim 1, wherein said pouring is conducted such that said polyimide platy object has a thickness from 150 µm to 10 mm.

12. A polyimide platy object prepared by a process according to claim 1, said polyimide platy object having a Young's modulus of 2 GPa or greater, an average thermal expansion coefficient of 60 ppm or greater over a range of 50–300° C., a glass transition temperature of 300° C. or higher, a surface roughness of 50 nm or less, and a thickness of from 150 µm to 10 mm.

13. An optical device comprising a polyimide platy object according to claim 12 as a substrate of said optical device.

14. A process according to claim 1, wherein the steps (a), (b), (c), (d), and (e) are conducted sequentially.

15. A process according to claim 1, wherein said first and second surfaces of said precursory platy object are respectively first and second major surfaces of said precursory platy object, and wherein said heating is conducted while said first and second major surfaces are separated from said supporting member.

* * * * *